United States Patent [19]

Buratti et al.

[11] Patent Number: 5,778,850
[45] Date of Patent: Jul. 14, 1998

[54] METHOD AND DEVICE FOR CONTROLLING TRANSIENT-STATE INJECTION OF A SUPERCHARGED DIESEL ENGINE

[75] Inventors: Riccardo Buratti, Genova; Alessandro Carlo, Torino, both of Italy

[73] Assignee: C.R.F. Societa Consortile per Azioni, Orbassano, Italy

[21] Appl. No.: 876,025

[22] Filed: Jun. 13, 1997

[30] Foreign Application Priority Data

Jun. 14, 1996 [IT] Italy .................... T096A0513
Jun. 14, 1996 [IT] Italy .................... T096 A0514

[51] Int. Cl.[6] ............................................. F02B 3/00
[52] U.S. Cl. ........................ 123/299; 123/436; 123/675
[58] Field of Search ....................... 123/299, 36, 675, 123/295, 357

[56] References Cited

U.S. PATENT DOCUMENTS

| | | | |
|---|---|---|---|
| 4,811,899 | 3/1989 | Egler | 123/299 |
| 5,078,107 | 1/1992 | Morikawa | 123/295 |
| 5,101,785 | 4/1992 | Ito | 123/357 |
| 5,231,962 | 8/1993 | Osuka et al. | 123/299 |

*Primary Examiner*—Raymond A. Nelli
*Attorney, Agent, or Firm*—Evenson, Mckeown, Edwards & Lenahan P.L.L.C.

[57] ABSTRACT

The method includes the steps of generating a reference injection pressure value as a function of the speed of a diesel engine and of the quantity of fuel supplied to the engine, the reference injection pressure value defining an optimum injection pressure value for steady-state operation of the engine; generating an incremental injection pressure value as a function of the speed of the engine and the supercharge pressure of the engine, the incremental injection pressure value defining the maximum permissible variation in injection pressure between one engine cycle and the next during a transient operating state of the engine; and generating a desired injection pressure value as a function of the reference injection pressure value and the incremental injection pressure value, and such that the variation in injection pressure during the transient operating state of the engine does not exceed the maximum permissible value.

26 Claims, 7 Drawing Sheets

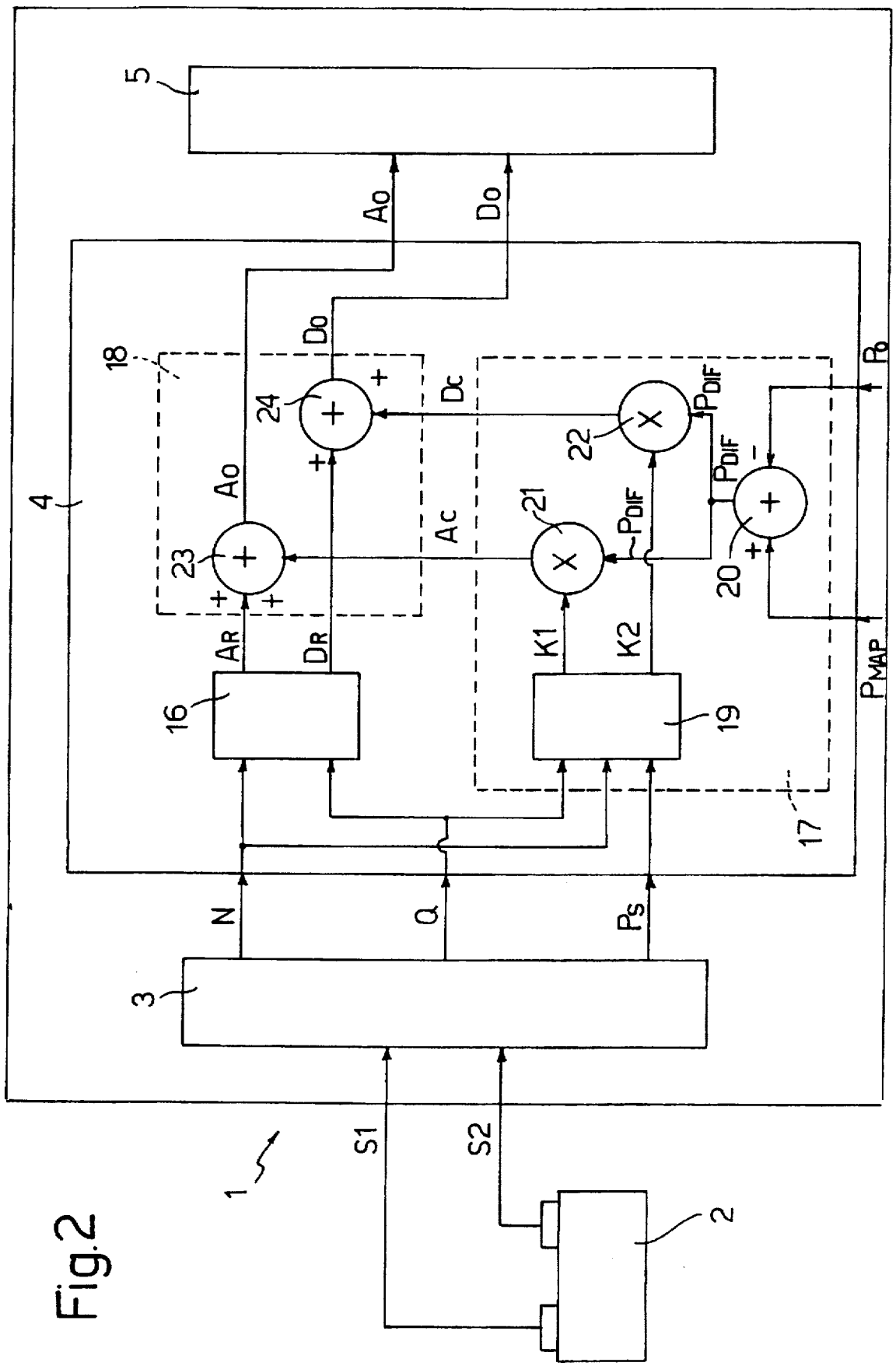

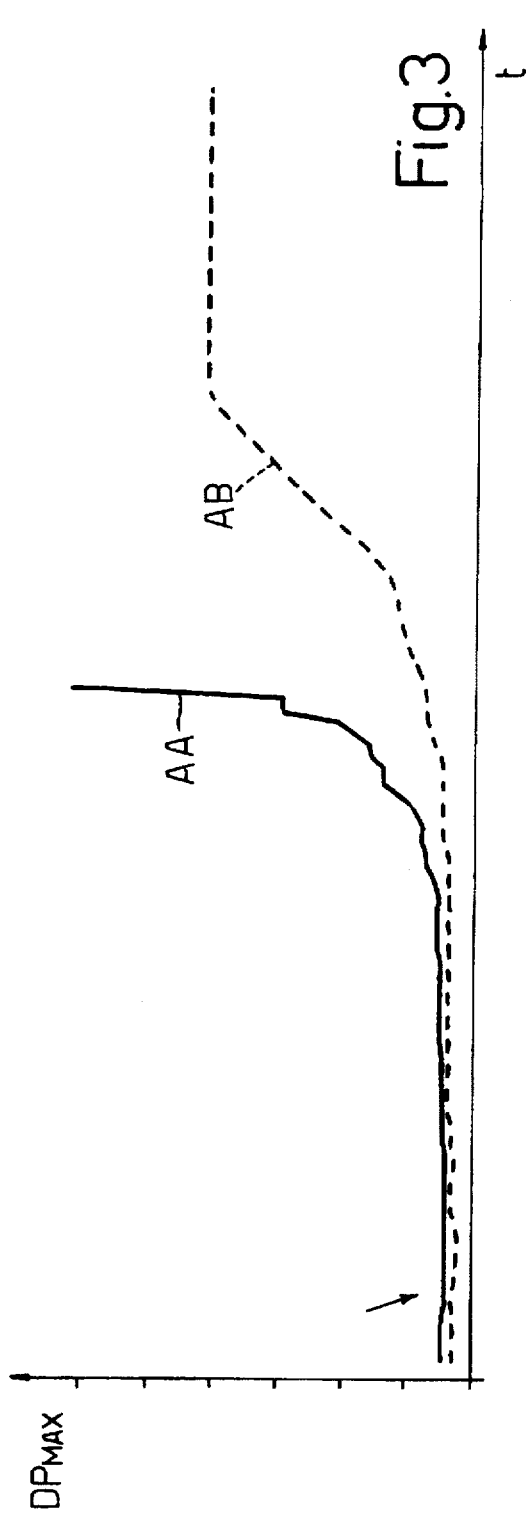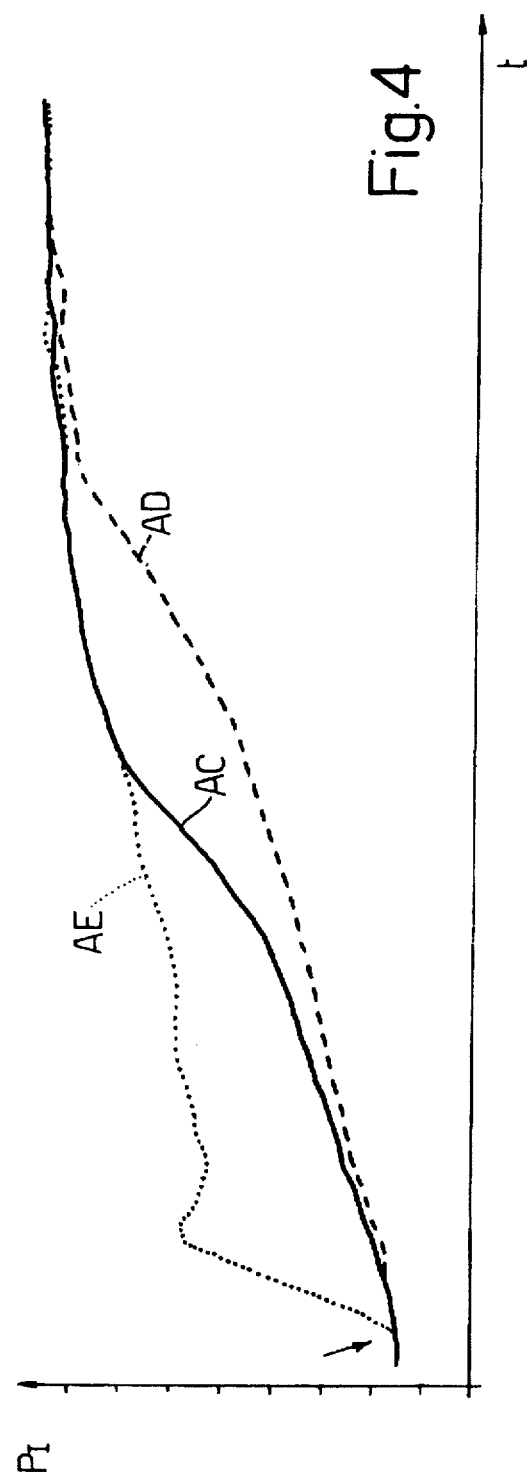

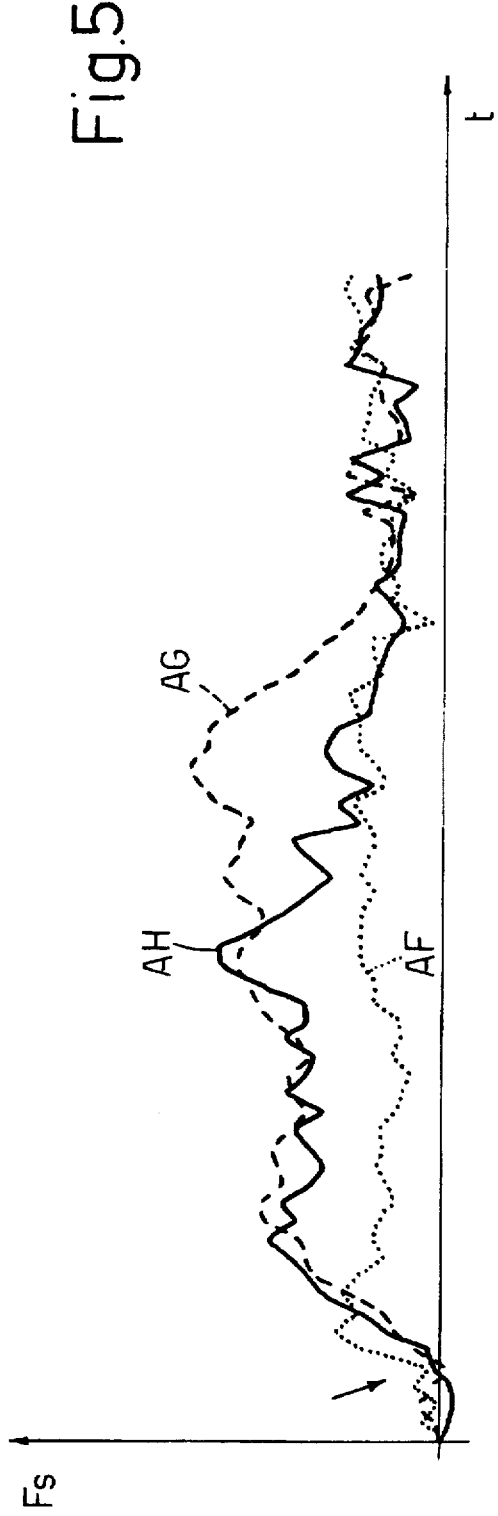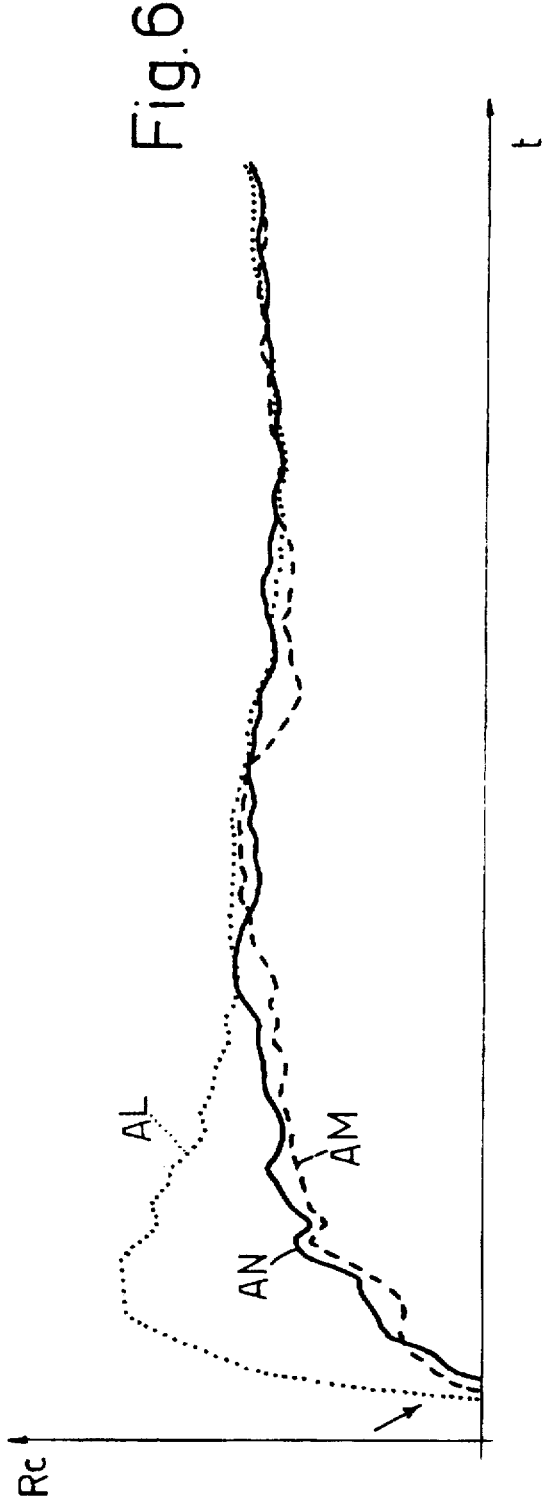

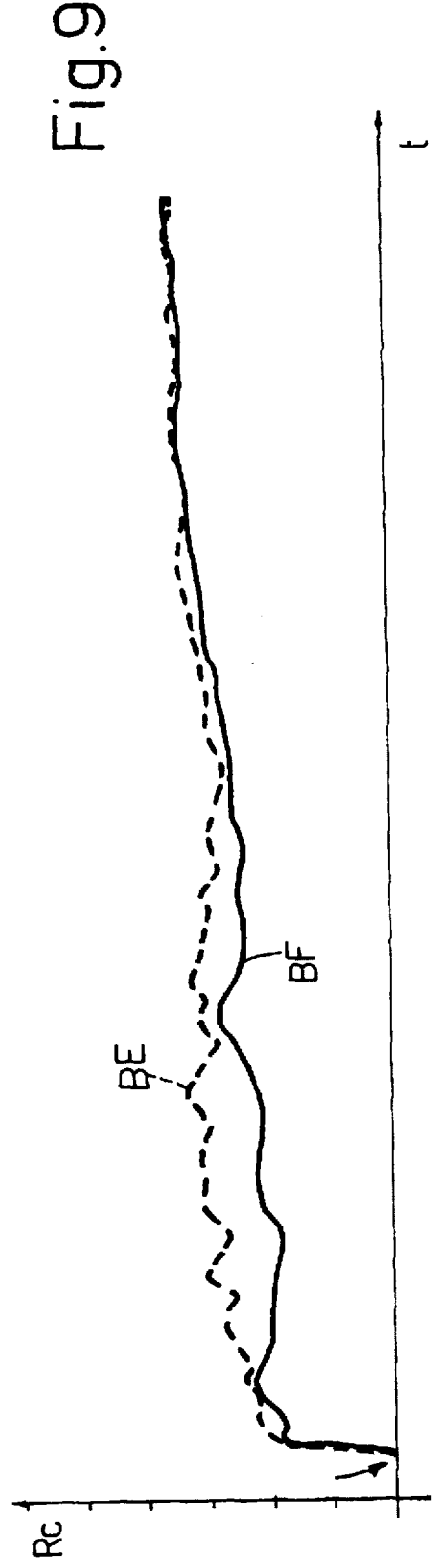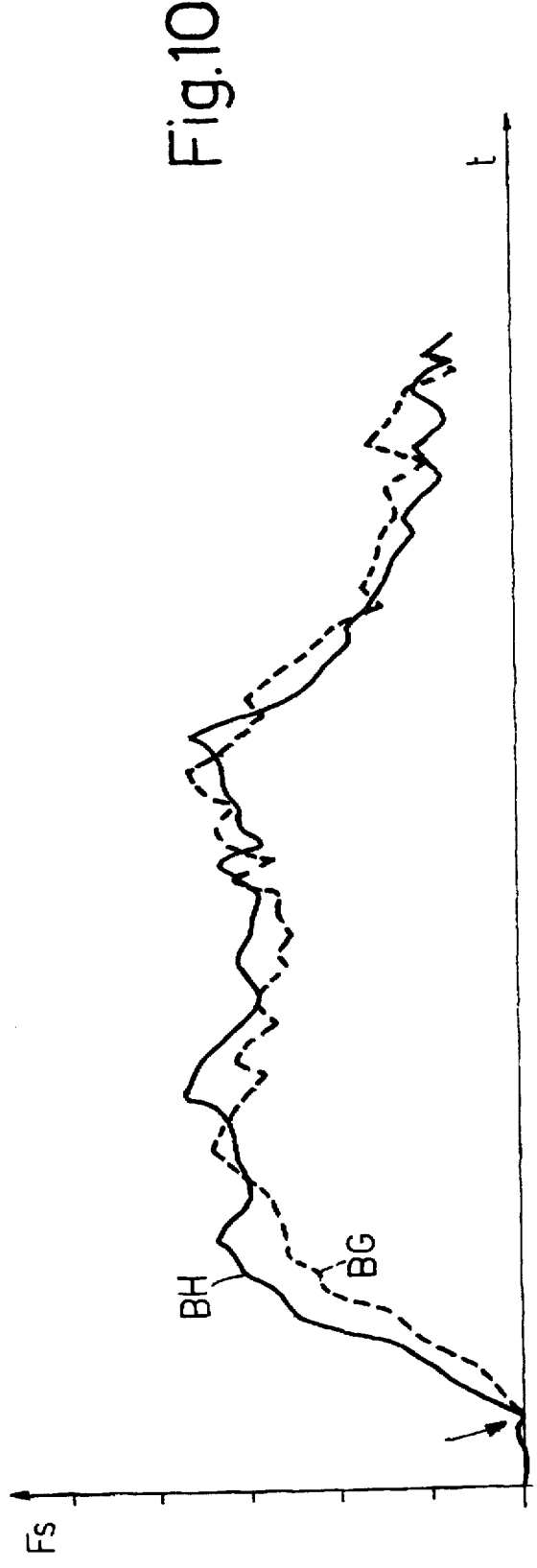

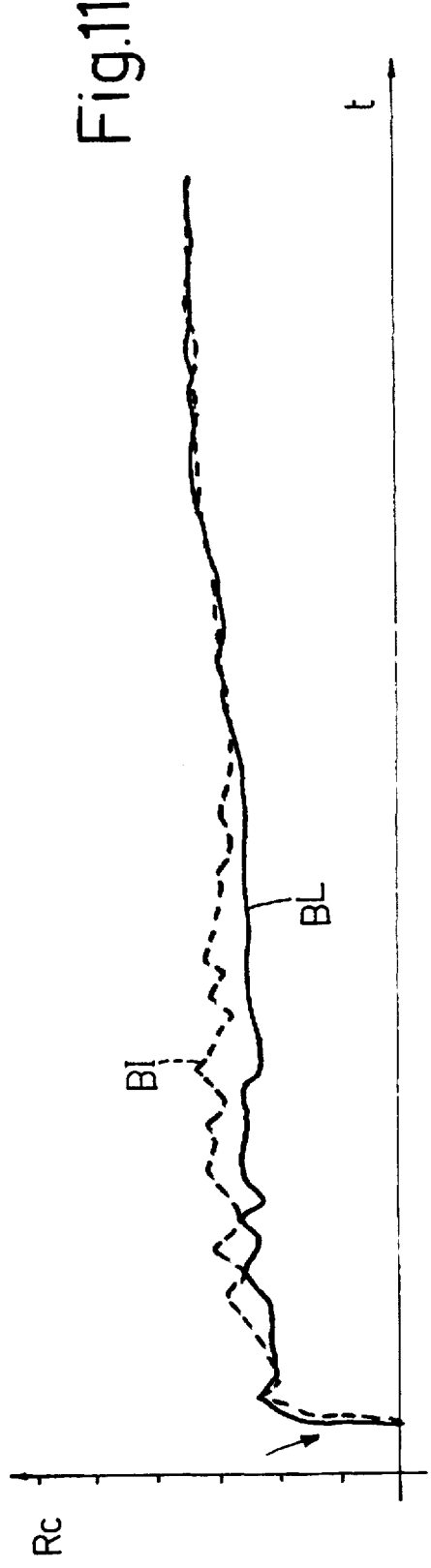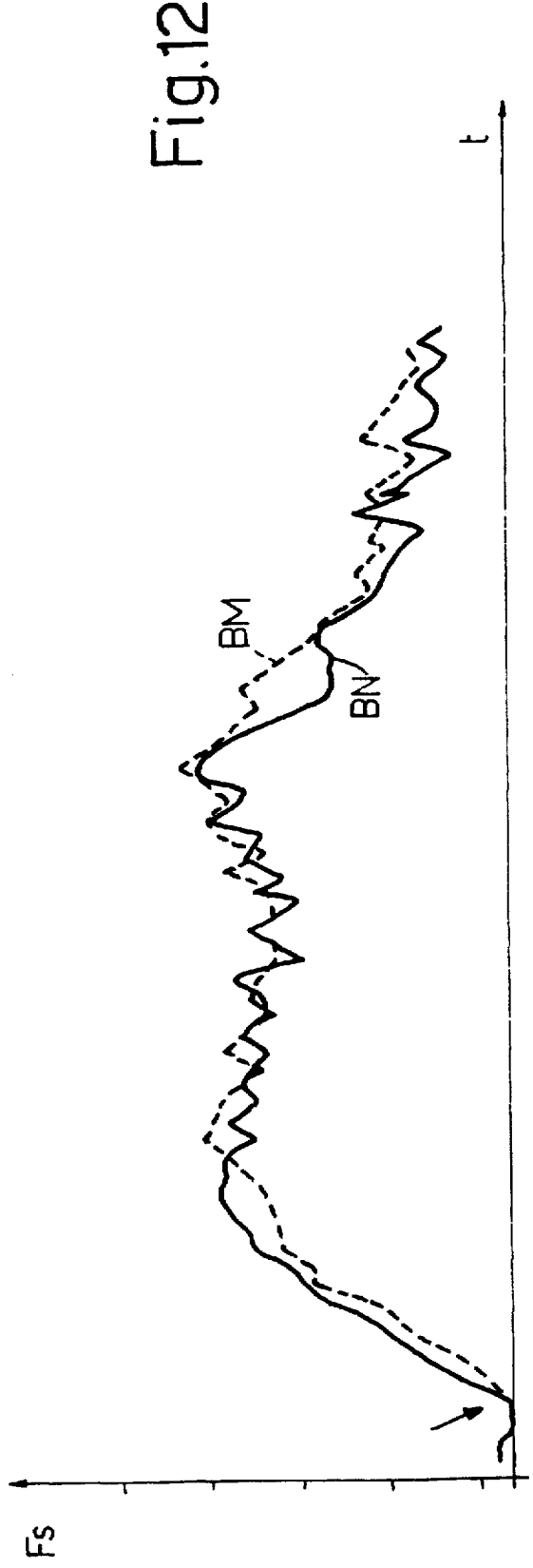

5,778,850

1

METHOD AND DEVICE FOR CONTROLLING TRANSIENT-STATE INJECTION OF A SUPERCHARGED DIESEL ENGINE

BACKGROUND OF THE INVENTION

The present invention relates to a method and device for controlling transient-state injection of a supercharged diesel engine.

As is known, during transient-state operation of a diesel engine, e.g. when accelerating rapidly, a sudden increase is generated in fuel injection pressure to reduce the exhaust smoke level, but which also results in a disturbingly high combustion noise level of the engine.

To reduce the increase in noise level, devices have been devised for controlling injection pressure, and which supply an optimum injection pressure value for all engine speeds, including transient speeds.

Patent Application WO-95/23921 filed on Feb. 28, 1995, for example, describes a control device for slowing down the increase in injection pressure and imposing a maximum rate of increase varying according to engine speed and the amount of fuel supplied to the engine.

In such a device, however, calibrating the maximum rate of increase in injection pressure is especially difficult and fails to provide for optimizing each individual acceleration, so that a good deal of compromise is involved in meeting the requirements of different conditions.

Moreover, in calibrating the maximum rate of increase, no account is taken of quantities seriously affecting combustion noise and exhaust smoke level, such as engine load prior to acceleration, and the gear engaged at the start of acceleration.

As such, while reducing the combustion noise of the engine, the control device described presents the drawback of increasing the exhaust smoke level by generating a less than optimum transient-state rate of increase in injection pressure.

To reduce combustion noise of the engine, an injection scheme has also been proposed involving, at each engine cycle, a dual injection comprising a short pilot injection followed by a longer main injection.

According to this scheme, the pilot injection supplies a small amount of fuel to initiate precombustion and so increase the temperature and pressure inside the combustion chamber of the cylinders and improve the efficiency and reduce the explosive effect of the combustion initiated by the main injection.

While indeed providing for an overall reduction in combustion noise, a pilot injection fails to eliminate the contribution made by a sudden increase in injection pressure as a result, say, of rapid acceleration.

Moreover, at present, pilot injection duration and advance are calculated with respect to steady-state operation of the engine with a predetermined temperature and pressure inside the combustion chamber of the cylinders, and are therefore ineffective when applied to transient-state operation of the engine in which the temperature and pressure inside the combustion chamber of the cylinders is lower.

More specifically, during transient-state operation of the engine, the steady-state pilot injection advance values are too high, so that the pilot injection initiates combustion in which the mixture fails to burn effectively. As a result, the temperature and pressure inside the combustion chamber of the cylinders fail to reach the predicted values when the main injection is performed, thus impairing improvement by the pilot injection of the combustion initiated by the main injection.

SUMMARY OF THE INVENTION

It is an object of the present invention to provide a straightforward, low-cost method and device for more effectively controlling injection pressure and so achieving a better compromise between the combustion noise and exhaust smoke level of the engine.

Preferably, the control method and device according to the present invention must also be capable of more effectively controlling the pilot injection during transient-state operation of the engine.

According to the present invention, there is provided a method of controlling injection during a transient operating state of a supercharged diesel engine, the method comprising the steps of:

generating, at each engine cycle, a reference injection pressure value as a function of at least a first operating parameter of said engine, said reference injection pressure value defining an optimum injection pressure value for steady-state operation of the engine;

generating, at each engine cycle, an incremental injection pressure value as a function of at least a second operating parameter of said engine, said incremental injection pressure value defining the maximum permissible variation in injection pressure between one engine cycle and the next during said transient operating state of the engine; and generating a desired injection pressure value at each engine cycle as a function of said reference injection pressure value and said incremental injection pressure value, and such that the variation in the injection pressure of said engine during said transient operating state does not exceed said maximum permissible value;

characterized in that said second operating parameter is the supercharge pressure of said engine.

According to the present invention, there is also provided a device for controlling injection during a transient operating state of a supercharged diesel engine, the device comprising:

first processing means receiving at least a first operating parameter of said engine, and generating, at each engine cycle, a reference injection pressure value defining an optimum injection pressure value for steady-state operation of the engine;

second processing means receiving at least a second operating parameter of said engine, and generating, at each engine cycle, an incremental injection pressure value defining the maximum permissible variation in injection pressure between one engine cycle and the next during said transient operating state of said engine; and third processing means receiving said reference injection pressure value and said incremental injection pressure value, and generating, at each engine cycle, a desired injection pressure value as a function of said reference injection pressure value and said incremental injection pressure value, and such that the variation in the injection pressure of said engine during said transient operating state does not exceed said maximum permissible value;

characterized in that said second operating parameter is the supercharge pressure of said engine.

BRIEF DESCRIPTION OF THE DRAWINGS

A preferred, non-limiting embodiment of the present invention will be described by way of example with reference to the accompanying drawings, in which:

FIG. 2 shows a block diagram of an electronic central control unit comprising a control device in accordance with a second aspect of the present invention;

FIGS. 3 to 12 show time graphs of quantities controlled by the FIG. 1 and 2 control device.

DETAILED DESCRIPTION OF THE INVENTION

Figure 1:
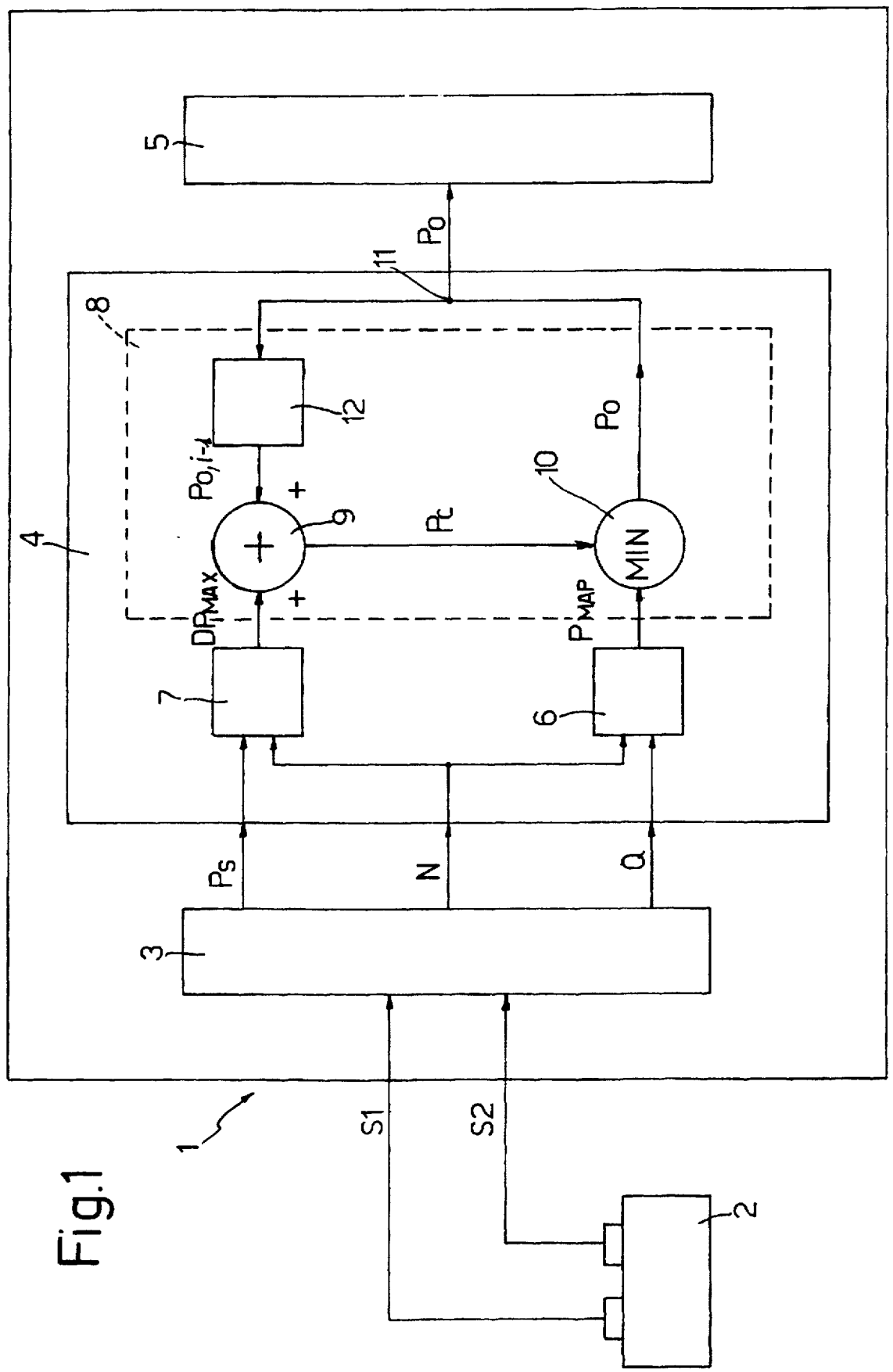
FIG. 1 shows a block diagram of an electronic central control unit comprising a control device in accordance with a first aspect of the present invention.

Number 1 in FIG. 1 indicates an electronic central control unit for controlling common-rail injection of a supercharged direct-injection diesel engine 2.

Electronic central control unit 1—of which only the parts pertinent to the present invention are shown—comprises a parameter calculating unit 3 receiving signals measured on engine 2, and generating operating parameters of engine 2 required for controlling injection; a control device 4 receiving said operating parameters, and generating injection control parameters; and a known injection pressure regulating unit 5 (not described in detail) supplied with said injection control parameters.

More specifically, parameter calculating unit 3 receives a signal $S_1$ related to the speed of engine 2, and a signal $S_2$ related to the supercharge pressure $P_s$ of engine 2, and generates operating parameters of engine 2, such as speed N, the quantity Q of fuel injected, and a quantized, digitized supercharge pressure $P_s$.

According to a first aspect of the present invention, control device 4 receives parameters N, Q and $P_s$, and generates at each engine cycle a desired injection pressure value $P_o$, which is supplied to and used by regulating unit 5 to control injection pressure.

More specifically, control device 4 comprises a first and second processing unit 6, 7 receiving parameters N, Q and $P_s$, and generating respective intermediate values; and a third processing unit 8 receiving said intermediate values, and generating value $P_o$.

More specifically, first processing unit 6 receives parameters N and Q, and generates for each engine cycle a reference injection pressure value $P_{MAP}$, which is supplied to third processing unit 8 and defines an optimum injection pressure value for steady-state operation of the engine as defined by parameters N and Q. By way of example, first processing unit 6 may comprise a map in which $P_{MAP}$ values as a function of parameters N and Q are memorized.

Second processing unit 7 receives parameters N and $P_s$, and generates for each engine cycle an incremental injection pressure value $DP_{MAX}$, which is supplied to third processing unit 8 and defines the maximum permissible variation in injection pressure between one engine cycle and the next during the transient operating state of engine 2. By way of example, second processing unit 7 may comprise a map in which $DP_{MAX}$ values as a function of parameters N and $P_s$ are memorized.

Third processing unit 8 receives reference injection pressure value $P_{MAP}$ and incremental injection pressure value $DP_{MAX}$, and generates at each engine cycle a desired injection pressure value $P_O$ as a function of $P_{MAP}$ and $DP_{MAX}$, and such that the variation in injection pressure between one engine cycle and the next during the transient operating state of the engine does not exceed the maximum permissible value.

More specifically, third processing unit 8 comprises a first adding circuit 9 receiving at each engine cycle (indicated by the letter i) incremental injection pressure value $DP_{MAX}$ and the desired injection pressure value $P_{o,i-1}$ calculated at the previous engine cycle i-1 as described in detail later on, and generating a corrected injection pressure value $P_c$ equal to the sum of $P_{o,i-1}$ and $DP_{MAX}$.

Corrected injection pressure value $P_c$ defines the correct injection pressure value to conform, in the i-th engine cycle, with the set maximum permissible variation in injection pressure.

Third processing unit 8 also comprises a discriminating circuit 10 receiving reference injection pressure value $P_{MAP}$ and corrected injection pressure value $P_c$, and generating (node 11) a desired injection pressure value $P_o$ equal to the lesser of $P_{MAP}$ and $P_c$.

Third processing unit 8 also comprises a memorizing circuit 12 having an input connected to node 11, and which provides for memorizing the desired injection pressure value $P_o$ calculated at the i-th engine cycle and to be supplied to adding circuit 9 at the next engine cycle.

Reference injection pressure value $P_{MAP}$ and desired injection pressure value $P_o$ are also supplied to other parts of control device 4 for performing functions on the basis of injection pressure as described later on with reference to FIG. 2.

Reference injection pressure value $P_{MAP}$ and desired injection pressure value $P_o$ may also be supplied to other parts of electronic central control unit 1 for performing functions on the basis of injection pressure, e.g. to a unit (not shown in FIG. 1) for calculating the injection advance angle, and as described in detail in aforementioned Patent Application WO-95/23921.

Operation of control device 4 in FIG. 1 will be clear from the foregoing description. Suffice it to say that, in the absence of discriminating circuit 10, a transient operating state of the engine, e.g. as a result of rapid acceleration, would produce a sudden increase in parameters N and Q and a sharp increase in reference injection pressure value $P_{MAP}$ generated by first processing unit 6.

In turn, the reference injection pressure value $P_{MAP}$ supplied directly to injection pressure regulating unit 5 would produce a rapid increase in injection pressure and, hence, a high combustion noise level of engine 2.

According to the present invention, however, regulating unit 5 is supplied with a desired injection pressure value $P_o$, which, during the transient operating state of engine 2, is lower than reference injection pressure value $P_{MAP}$.

During the transient operating state of the engine, desired injection pressure value $P_o$ therefore presents a lower rate of increase as compared with reference injection pressure value $P_{MAP}$, by virtue of being incremented by a quantity equal to incremental injection pressure value $DP_{MAX}$ at each engine cycle.

By the time corrected injection pressure value Pc reaches reference injection pressure value $P_{MAP}$, the transient operating state of the engine is over, and injection pressure regulating unit 5 is once more supplied with reference injection pressure value $P_{MAP}$ defining the optimum injection pressure value for steady-state operation of engine 2.

Generating incremental injection pressure value $DP_{MAX}$ as a function of the speed N and supercharge pressure $P_s$ of engine 2 provides for greatly reducing the exhaust smoke level as compared with said known solution, wherein incremental injection pressure value $DP_{MAX}$ is calculated as a function of parameters N and Q.

The supercharge pressure value, in fact, is lower during transient-state than during steady-state operation of engine 2, due to delay by the turbosupercharger in adapting to new operating conditions, and laboratory tests have shown that calculating $DP_{MAX}$ on the basis of a parameter related to the supercharge pressure value provides for straightforward, definite calibration of the maximum rate of increase in injection pressure under any acceleration conditions.

Moreover, calibrating the maximum rate of increase on the basis of such a parameter also provides for taking into account quantities seriously affecting the combustion noise and smoke level of engine 2, such as engine load prior to acceleration and the gear engaged at the start of acceleration.

As such, control device 4 according to the present invention provides for achieving a better transient-state rate of increase in injection pressure and, as compared with the known device, a better compromise between the combustion noise and smoke level of engine 2 under any acceleration conditions.

This is clearly shown in FIGS. 3 to 6, in which the dotted, dash and continuous lines respectively show the time curves of a quantity using no control device at all, using the known control device, and using control device 4 according to the invention. The arrow in FIGS. 3 to 6 indicates the start of the transient operating state.

More specifically, FIG. 3 shows a time graph of incremental injection pressure value $DP_{MAX}$. As can be seen, using control device 4 according to the invention (curve AA), a transient operating state of engine 2 produces a sharper increase in incremental injection pressure value $DP_{MAX}$ as compared with the known control device (curve AB), thus resulting, as shown in FIG. 4, in a better rate of increase in injection pressure as compared with the known device.

More specifically, FIG. 4 shows a time graph of injection pressure $P_I$ of engine 2, and clearly shows how, using the device according to the present invention (curve AC), a transient operating state of engine 2 produces a sharper increase in injection pressure than the known control device (curve AD) but a more gradual increase than when no control device at all is used (curve AE). In other words, using control device 4, injection pressure increases more rapidly than with the known device, and less rapidly than if no control device at all is used.

The improved rate of increase in injection pressure is clearly reflected in the exhaust smoke level of engine 2 with no impairment in the combustion noise level, as shown in FIGS. 5 and 6, which show respective time graphs of the exhaust smoke level $F_s$ and combustion noise level $R_c$ of engine 2.

As shown clearly in FIG. 5, during a transient operating state of engine 2, the smoke levels obtained using the known device (curve AG) and control device 4 (curve AH) have a substantially identical initial portion, and an end portion in which, though higher than when no control device at all is used (curve AF), control device 4 provides for a considerable reduction in the exhaust smoke level as compared with the known device.

Moreover, the improvement in the exhaust smoke level is achieved with no impairment in the combustion noise level of engine 2. As shown clearly in FIG. 6, in fact, during a transient operating state, the combustion noise level increases considerably in the absence of any control device (curve AL), but considerably less in the presence of the known control device (curve AM) and control device 4 (curve AN).

In other words, calculating the maximum rate of increase ($DP_{MAX}$) in injection pressure on the basis of the supercharge pressure provides for a considerable reduction in the exhaust smoke level of engine 2, at least towards the end of the transient operating state, with no impairment in the combustion noise level of engine 2.

FIG. 2 shows a block diagram of electronic central control unit 1 similar to that in FIG. 1, in which the parts common to both are indicated using the same numbering system, and which shows a further part of control device 4 in accordance with a second aspect of the present invention.

According to the second aspect of the present invention, in addition to desired pressure value $P_o$, control device 4 also generates an operating advance value $A_o$ and an operating duration value $D_o$ respectively defining the implemented pilot injection advance value and implemented pilot injection duration value, and which are also supplied to and used by regulating unit 5 to control the pilot injection.

More specifically, control device 4 also comprises a fourth and fifth processing unit 16, 17 receiving parameters N, Q and $P_s$, and generating respective intermediate values; and a sixth processing unit 18 receiving the intermediate values, and generating values $A_o$ and $D_o$.

More specifically, fourth processing unit 16 receives parameters N and Q, and generates at each engine cycle a reference advance value $A_R$ and a reference duration value $D_R$, which are supplied to sixth processing unit 18 and respectively define an optimum pilot injection advance value and an optimum pilot injection duration value for steady-state operation of engine 2 as defined by parameters N and Q. By way of example, fourth processing unit 16 may comprise a map in which values $A_R$ and $D_R$ as a function of parameters N and Q are memorized.

Fifth processing unit 17 receives parameters N, Q, $P_s$, a reference injection pressure value $P_{MAP}$ and a desired injection pressure value $P_o$, as described in detail with reference to FIG. 1, and generates at each engine cycle an advance correction value $A_c$ and a duration correction value $D_c$ respectively defining the correction to be made to the pilot injection advance and duration during the transient operating state of engine 2.

Alternatively, reference injection pressure value $P_{MAP}$ and desired injection pressure value $P_o$ may be generated by a control device of the type described in WO-95/23921 filed on Feb. 28, 1995.

Fifth processing unit 17 comprises a calculating circuit 19 receiving parameters N, Q and $P_s$, generating a first and second multiplication coefficient $K_1$, $K_2$, and which may, for example, comprise a map in which coefficients $K_1$ and $K_2$ as a function of parameters N, Q and $P_s$ are memorized.

Fifth processing unit 17 also comprises a second adding circuit 20 receiving reference injection pressure value $P_{MAP}$ and desired injection pressure value $P_o$, and generating a differential injection pressure value PDIF equal to the difference between $P_{MAP}$ and $P_o$; a first multiplying circuit 21 receiving differential injection pressure value $P_{DIF}$ and first multiplication coefficient $K_1$, and generating an advance correction value $A_c$ equal to $P_{DIF}$ multiplied by $K_1$; and a second multiplying circuit 22 receiving differential injection pressure value $P_{DIF}$ and second multiplication coefficient $K_2$, and generating a duration correction value $D_c$ equal to $P_{DIF}$ multiplied by $K_2$.

Sixth processing unit 18 comprises a third adding circuit 23 receiving reference advance value $A_R$ and advance correction value $A_c$, and generating an operating advance value $A_o$ equal to the algebraic sum of $A_R$ and $A_c$; and a fourth adding circuit 24 receiving reference duration value $D_R$ and duration correction value $D_c$, and generating an operating duration value $D_o$ equal to the algebraic sum of $D_R$ and $D_c$.

Operation of control device 4 in FIG. 2 will be clear from the foregoing description. Suffice it to say that, according to the present invention, during the transient operating states of engine 2, operating pilot injection advance and duration values $A_o$ and $D_o$ are calculated as a function of the difference between the optimum injection pressure value for steady-state operation of engine 2 ($P_{MAP}$) and the desired injection pressure value at each engine cycle ($P_o$), and as a function of multiplication coefficients $K_1$, $K_2$, which provide for taking into account the operating state of engine 2 as defined by operating parameters N, Q and $P_r$.

A positive or negative sign of coefficients $K_1$ and $K_2$ increases or reduces the pilot injection advance ($A_o$) and duration ($D_o$) values. That is, the pilot injection advance value ($A_o$) is reduced by a quantity proportional to the difference between the optimum injection pressure value for steady-state operation of engine 2 ($P_{MAP}$) and the desired injection pressure value at each engine cycle ($P_o$), if first multiplication coefficient $K_1$ is negative, and is increased if $K_1$ is positive. similarly, the pilot injection duration value ($D_o$) is reduced by a quantity proportional to said difference, if second multiplication coefficient $K_2$ is negative, and is increased if $K_2$ is positive.

The above corrections to the pilot injection advance and duration values may be made simultaneously or singly, and each provides for greatly reducing the combustion noise level of engine 2 as compared with no correction at all.

This is clearly shown in FIGS. 7 to 12, in which the continuous and dotted lines show the time curves of a quantity obtained respectively with and without control device 4. The arrow in FIGS. 7 to 12 indicates the start of the transient operating stage of engine 2.

Figure 7:
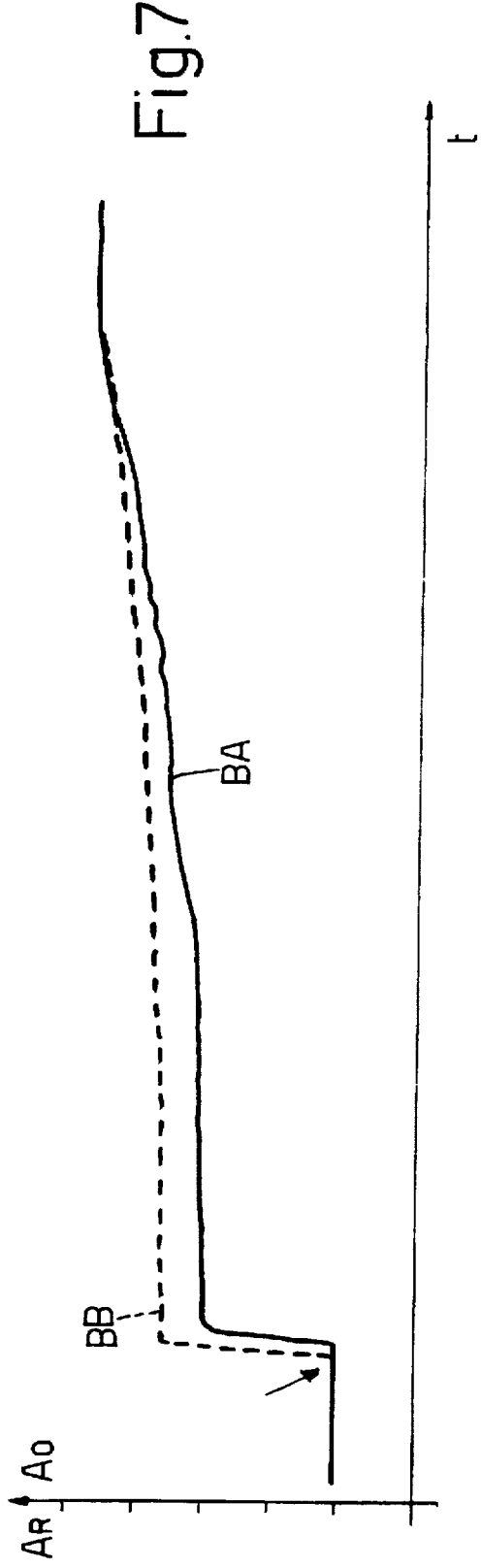

More specifically, FIG. 7 shows a time graph of pilot injection operating and reference advance values $A_o$ and $A_R$, and clearly shows how, during a transient operating state, control device 4 provides for reducing the pilot injection advance value (curve BA) with respect to the steady-state value (curve BB).

Figure 8:
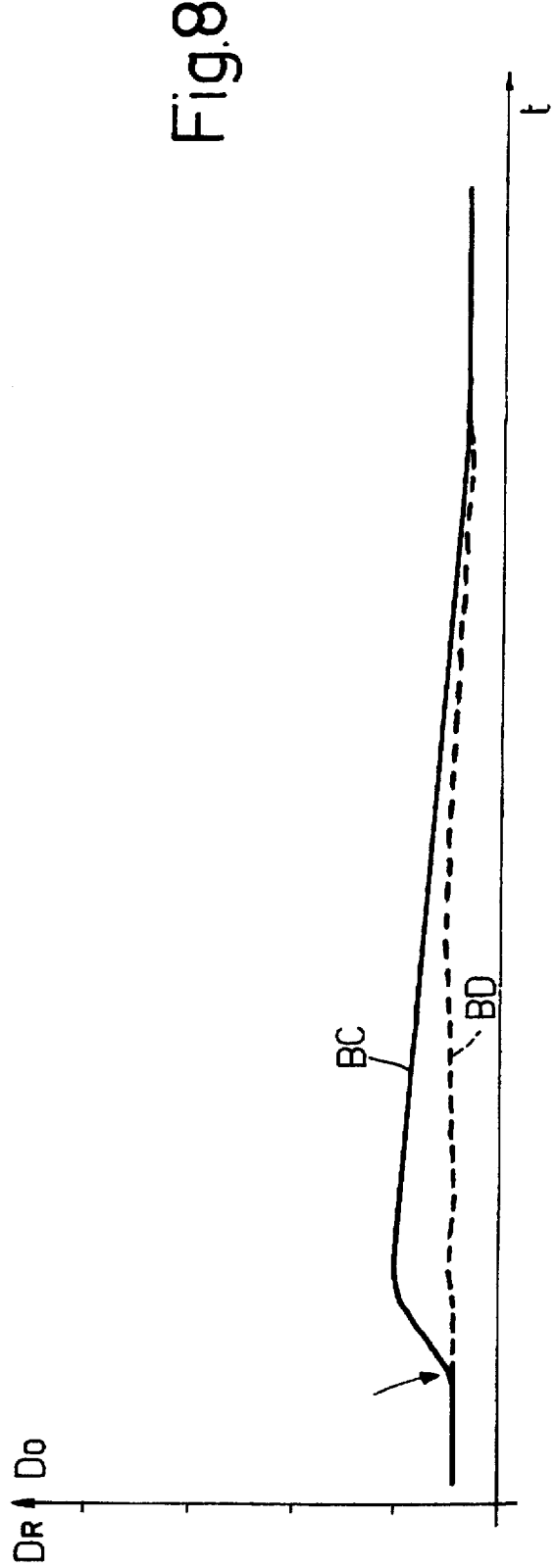

FIG. 8, on the other hand, shows a time graph of pilot injection operating and reference duration values $D_o$ and $D_R$, and clearly shows how, during a transient operating state, control device 4 provides for increasing the pilot injection duration value (curve BC) with respect to the steady-state value (curve BD).

As shown in FIGS. 9 to 12, the corrections made to the pilot injection advance and duration values each provide for reducing the combustion noise $R_c$ of engine 2 with no increase in the exhaust smoke level $F_s$.

More specifically, curves BF and BE in FIG. 9 (relative to combustion noise $R_c$) and curves BH and BG in FIG. 10 (relative to exhaust smoke level $F_s$) show the difference in said quantities with and with no pilot injection advance correction; and curves BL and BI in FIG. 11 (relative to combustion noise $R_c$) and curves BN and BM in FIG. 12 (relative to exhaust smoke level $F_s$) show the difference in said quantities with and with no pilot injection duration correction.

Clearly, changes may be made to the control method and device as described and illustrated herein without, however, departing from the scope of the present invention.

We claim:

1. A method of controlling injection during a transient operating state of a supercharged diesel engine (2), the method comprising the steps of:

generating, at each engine cycle, a reference injection pressure value ($P_{MAP}$) as a function of at least a first operating parameter (N, Q) of said engine (2), said reference injection pressure value ($P_{MAP}$) defining an optimum injection pressure value for steady-state operation of the engine (2);

generating, at each engine cycle, an incremental injection pressure value ($DP_{MAX}$) as a function of at least a second operating parameter (N, $P_s$) of said engine (2), said incremental injection pressure value ($DP_{MAX}$) defining the maximum permissible variation in injection pressure between one engine cycle and the next during said transient operating state of the engine (2); and generating a desired injection pressure value ($P_o$) at each engine cycle as a function of said reference injection pressure value ($P_{MAP}$) and said incremental injection pressure value ($DP_{MAX}$), and such that the variation in the injection pressure of said engine (2) during said transient operating state does not exceed said maximum permissible value;

characterized in that said second operating parameter is the supercharge pressure ($P_s$) of said engine (2).

2. A method as claimed in claim 1, characterized in that said incremental injection pressure value ($DP_{MAX}$) is also generated as a function of the speed (N) of said engine (2).

3. A method as claimed in claim 1, characterized in that said step of generating a desired injection pressure value ($P_o$) at each engine cycle comprises the steps of:

generating a corrected injection pressure value ($P_c$) by adding said incremental injection pressure value ($DP_{MAX}$) and an operating injection pressure value ($P_{o,i-1}$);

generating said desired injection pressure value ($P_o$) equal to the lesser of said corrected injection pressure value ($P_c$) and said reference injection pressure value ($P_{MAP}$); and memorizing said desired injection pressure value ($P_o$) at each engine cycle; said operating injection pressure value ($P_{o,i-1}$) being equal, at each engine cycle, to the desired injection pressure value ($P_o$) memorized in a previous engine cycle.

4. A method as claimed in claim 1, characterized in that said first operating parameter is the speed (N) of said engine (2).

5. A method as claimed in claim 4, characterized in that said reference injection pressure value ($P_{MAP}$) is also generated as a function of the quantity (Q) of fuel supplied to said engine (2).

6. A method as claimed in claim 1, characterized by also comprising the steps of:

generating a reference value ($A_R$, $D_R$) as a function of at least a first operating parameter (N, Q) of said engine (2); said reference value ($A_R$, $D_R$) defining an optimum value of a control quantity for controlling pilot injection during steady-state operation of said engine (2):

generating a correction value ($A_c$, $D_c$) for correcting said reference value ($A_R$, $D_R$) and as a function of at least a second operating parameter (N, Q, $P_s$, $P_{MAP}$, $P_o$) of said engine (2); and generating an operating value ($A_o$, $D_o$) of said control quantity as a function of said reference value ($A_R$, $D_R$) and said correction value ($A_c$, $D_c$).

7. A method as claimed in claim 6, characterized in that said control quantity comprises the injection advance.

8. A method as claimed in claim 7, characterized by comprising the steps of:

generating a differential injection pressure value ($P_{DIF}$) equal to the difference between a reference injection pressure value ($P_{MAP}$) and a desired injection pressure value ($P_o$); said reference injection pressure value ($P_{MAP}$) defining an optimum injection pressure value for said steady-state operation of said engine (2); and said desired injection pressure value ($P_o$) defining a desired injection pressure value of the engine (2);

generating a first multiplication coefficient ($K_1$) as a function of at least a third operating parameter (N, Q, $P_s$) of said engine (2);

generating an advance correction value ($A_c$) by multiplying said differential injection pressure value ($P_{DIF}$) by said first multiplication coefficient ($K_1$);

generating a reference advance value ($A_R$) as a function of at least a first operating parameter (N, Q) of said engine (2); said reference advance value ($A_R$) defining an optimum value of a control quantity for controlling pilot injection during steady-state operation of said engine (2); and generating an operating advance value ($A_o$) by algebraically adding said reference advance value ($A_R$) and said advance correction value ($A_c$).

9. A method as claimed in claim 6, characterized in that said control quantity comprises the injection duration.

10. A method as claimed in claim 9, characterized by comprising the steps of:

generating a differential injection pressure value ($P_{DIF}$) equal to the difference between a reference injection pressure value ($P_{MAP}$) and a desired injection pressure value ($P_o$); said reference injection pressure value ($P_{MAP}$) defining an optimum injection pressure value for said steady-state operation of said engine (2); and said desired injection pressure value ($P_o$) defining a desired injection pressure value of the engine (2);

generating a second multiplication coefficient ($K_2$) as a function of at least a fourth operating value measured on said engine (2);

generating a duration correction value ($D_c$) by multiplying said differential injection pressure value ($P_{DIF}$) by said second multiplication coefficient ($K_2$);

generating a reference duration value ($D_R$) as a function of at least a first operating parameter (N, Q) of said engine (2); said reference duration value ($D_R$) defining an optimum value of a control quantity for controlling pilot injection during steady-state operation of said engine (2); and generating an operating duration value ($D_o$) by algebraically adding said reference duration value ($D_R$) and said duration correction value ($D_c$).

11. A method as claimed in claim 6, characterized in that said reference value ($A_R$, $D_R$) is generated as a function of the speed (N) of said engine (2) and the quantity (Q) of fuel supplied to said engine (2).

12. A method as claimed in claim 8, characterized in that said first multiplication coefficient ($K_1$) is generated as a function of the speed (N) of said engine (2), the quantity (Q) of fuel supplied to said engine (2), and the supercharge pressure ($P_s$) of said engine (2).

13. A method as claimed in claim 10, characterized in that said second multiplication coefficient ($K_2$) is generated as a function of the speed (N) of said engine (2), the quantity (Q) of fuel supplied to said engine (2), and the supercharge pressure ($P_s$) of said engine (2).

14. A device for controlling injection during a transient operating state of a supercharged diesel engine (2), the device comprising:

first processing means (6) receiving at least a first operating parameter (N, Q) of said engine (2), and generating, at each engine cycle, a reference injection pressure value ($P_{MAP}$) defining an optimum injection pressure value for steady-state operation of the engine (2);

second processing means (7) receiving at least a second operating parameter (N, $P_s$) of said engine (2), and generating, at each engine cycle, an incremental injection pressure value ($DP_{MAX}$) defining the maximum permissible variation in injection pressure between one engine cycle and the next during said transient operating state of said engine; and third processing means (8) receiving said reference injection pressure value ($P_{MAP}$) and said incremental injection pressure value ($DP_{MAX}$), and generating, at each engine cycle, a desired injection pressure value ($P_o$) as a function of said reference injection pressure value ($P_{MAP}$) and said incremental injection pressure value ($DP_{MAX}$), and such that the variation in the injection pressure of said engine (2) during said transient operating state does not exceed said maximum permissible value;

characterized in that said second operating parameter is the supercharge pressure ($P_s$) of said engine (2).

15. A device as claimed in claim 14, characterized in that said second processing means (7) also receive the speed (N) of said engine (2).

16. A device as claimed in claim 15, characterized in that said third processing means (8) comprise:

first adding means (9) receiving said incremental injection pressure value ($DP_{MAX}$) and an operating injection pressure value ($P_{o,i-1}$), and generating a corrected injection pressure value ($P_c$) equal to the sum of said incremental injection pressure value ($DP_{MAX}$) and said operating injection pressure value ($P_{o,i-1}$);

discriminating means (10) receiving said corrected injection pressure value ($P_c$) and said reference injection pressure value ($P_{MAP}$), and generating said desired injection pressure value ($P_o$) equal to the lesser of said corrected injection pressure value ($P_c$) and said reference injection pressure value ($P_{MAP}$); and memorizing means (12) receiving said desired injection pressure value ($P_o$); said operating injection pressure value ($P_{o,i-1}$) being equal, at each engine cycle, to the desired injection pressure value ($P_o$) memorized at a previous engine cycle.

17. A device as claimed in claim 14, characterized in that said first operating parameter is the speed (N) of said engine (2).

18. A device as claimed in claim 17, characterized in that said first processing means (6) also receive the quantity (Q) of fuel supplied to said engine (2).

19. A device as claimed in claim 14, characterized by comprising:

fourth processing means (16) receiving at least a first operating parameter (N, Q) of said engine (2), and generating a reference value ($A_R$, $D_R$) defining an optimum value of a control quantity for controlling pilot injection during steady-state operation of said engine (2);

fifth processing means (17) receiving at least a second operating parameter (N, Q, $P_s$, $P_{MAP}$, $P_o$) of said engine (2), and generating a correction value ($A_c$, $D_c$) for correcting said reference value ($A_R$, $D_R$); and sixth processing means (18) receiving said reference value ($A_R$, $D_R$) and said correction value ($A_c$, $D_c$), and generating an operating value ($A_o$, $D_o$) of said control quantity.

20. A device as claimed in claim 19, characterized in that said control quantity comprises the injection advance.

21. A device as claimed in claim 20, characterized in that said fourth processing means (16) comprise first calculating means (16) receiving at least a first operating parameter (N, Q) of said engine (2), and generating a reference advance value ($A_R$) defining an advance optimum value for controlling pilot injection during steady-state operation of said engine (2);

said control device (4) also being characterized in that said fifth processing means (17) comprise:
    second adding means (20) receiving a reference injection pressure value ($P_{MAP}$) and a desired injection pressure value ($P_o$), and generating a differential injection pressure value ($P_{DIF}$) equal to the difference between said reference injection pressure value ($P_{MAP}$) and said desired injection pressure value ($P_o$); said reference injection pressure value ($P_{MAP}$) defining an optimum injection pressure value for said steady-state operation of said engine (2); and said desired injection pressure value ($P_o$) defining a desired injection pressure value of the engine (2);
    second calculating means (19) receiving at least a third operating parameter (N, Q, $P_s$) of said engine (2), and generating a first multiplication coefficient ($K_1$);
    first multiplying means (21) receiving said differential injection pressure value ($P_{DIF}$) and said first multiplication coefficient ($K_1$), and generating an advance correction value ($A_c$) equal to the product of said differential injection pressure value ($P_{DIF}$) and said first multiplication coefficient ($K_1$);
  said control device (4) also being characterized in that said sixth processing means (18) comprise:
    third adding means (23) receiving said reference advance value ($A_R$) and said advance correction value ($A_c$), and generating a n operating advance value ($A_o$) equal to the algebraic sum of said reference advance value ($A_R$) and said advance correction value ($A_c$).

22. A device as claimed in claim 19, characterized in that said control quantity comprises the injection duration.

23. A device as claimed in claim 22, characterized in that said fourth processing means (16) comprise third calculating means (16) receiving at least a first operating parameter (N, Q) of said engine (2), and generating a reference duration value ($D_R$) defining a duration optimum value for controlling pilot injection during steady-state operation of said engine (2);

said control device (4) also being characterized in that said fifth processing means (17) comprise:
    fourth adding means (20) receiving a reference injection pressure value ($P_{MAP}$) and a desired injection pressure value ($P_o$), and generating a differential injection pressure value ($P_{DIF}$) equal to the difference between said reference injection pressure value ($P_{MAP}$) and said desired injection pressure value ($P_o$); said reference injection pressure value ($P_{MAP}$) defining an optimum injection pressure value for said steady-state operation of said engine (2); and said desired injection pressure value ($P_o$) defining a desired injection pressure value of the engine (2);
    fourth calculating means (19) receiving at least a fourth operating parameter (N, Q, $P_s$) of said engine (2), and generating a second multiplication coefficient ($K_2$);
    second multiplying means (22) receiving said differential injection pressure value ($P_{DIF}$) and said second multiplication coefficient ($K_2$), and generating a duration correction value ($D_c$) equal to the product of said differential injection pressure value ($P_{DIF}$) and said second multiplication coefficient ($K_2$);
  said control device (4) also being characterized in that said sixth processing means (18) comprise:
    fifth adding means (24) receiving said reference duration value ($D_R$) and said duration correction value ($D_c$), and generating an operating duration value ($D_o$) equal to the algebraic sum of said reference duration value ($D_R$) and said duration correction value ($D_c$).

24. A device as claimed in claim 19, characterized in that said fourth processing means (16) receive a speed (N) of said engine (2) and a quantity (Q) of fuel supplied to said engine (2).

25. A device as claimed in claim 21, characterized in that said first calculating means (19) receive the speed (N) of said engine (2), the quantity (Q) of fuel supplied to said engine (2), and the supercharge pressure ($P_s$) of said engine (2).

26. A device as claimed in claim 23, characterized in that said second calculating means (19) receive the speed (N) of said engine (2), the quantity (Q) of fuel supplied to said engine (2), and the supercharge pressure ($P_s$) of said engine (2).

* * * * *